(12) United States Patent
Ditzel et al.

(10) Patent No.: US 7,122,761 B2
(45) Date of Patent: Oct. 17, 2006

(54) FRICTION PROCESSING WELD PREPARATION

(75) Inventors: Peter J. Ditzel, Orlando, FL (US); Roy K. Holbert, Jr., Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 178 days.

(21) Appl. No.: 10/292,294

(22) Filed: Nov. 12, 2002

(65) Prior Publication Data

US 2004/0089646 A1    May 13, 2004

(51) Int. Cl.
*B23K 20/12*   (2006.01)

(52) U.S. Cl. ............... 219/121.64; 219/61; 228/112.1

(58) Field of Classification Search ............ 228/112.1, 228/164, 173.1, 173.6; 219/61, 121.64, 121.14
See application file for complete search history.

(56) References Cited

U.S. PATENT DOCUMENTS

| | | | |
|---|---|---|---|
| 3,130,294 A * | 4/1964 | Regnauld ................ 219/123 |
| 3,741,824 A | 6/1973 | Duvall et al. |
| 5,165,589 A | 11/1992 | Nied et al. |
| 5,509,980 A | 4/1996 | Lim |
| 5,725,698 A | 3/1998 | Mahoney |
| 5,975,406 A | 11/1999 | Mahoney et al. |
| 6,120,624 A | 9/2000 | Vogt et al. |
| 6,168,067 B1 | 1/2001 | Waldron et al. |
| 6,230,957 B1 | 5/2001 | Arbegast et al. |
| 6,308,882 B1 | 10/2001 | Shuster et al. |
| 6,398,883 B1 | 6/2002 | Forrest et al. |
| 6,422,449 B1 * | 7/2002 | Ezumi et al. ............ 228/114.5 |
| 6,454,531 B1 * | 9/2002 | Crawmer ................ 415/198.1 |
| 2002/0079351 A1 | 6/2002 | Mishra |

* cited by examiner

Primary Examiner—Len Tran

(57) ABSTRACT

A weld preparation process that translates a consumable or nonconsumable tool over an area that is subsequently to be welded to impart friction heating to the surface. Rotary or linearly oscillated motion between the tool and the workpiece is used to generate heat and produce deformation in the surface, resulting in recrystallization of the area being processed and a compressive residual stress.

6 Claims, 2 Drawing Sheets

FRICTION PROCESSING WELD PREPARATION

BACKGROUND OF THE INVENTION

1. Field of the Invention

The present invention relates in general to metal processing techniques and, more particularly, to processes involving the fabrication or welding of advanced nickel-base superalloys.

2. Related Art

The typical nickel-base superalloy is essentially a nickel-chromium solid solution (γ phase) hardened by the addition of materials such as aluminum and/or titanium to precipitate an intermetallic compound (γ' phase). The predominant intermetallic compound precipitated, represented by the formula $Ni_3$ (Al, Ti), is an ordered, face centered-cubic structure with aluminum and titanium at the corners of the unit cell and nickel at the face centers. These alloys also normally contain cobalt to raise the solvus temperature of the γ' phase, refractory metal additions for solution strengthening, and carbon, boron and zirconium to promote ductility and fabricability.

In the gas turbine engine industry in which the nickel-base superalloys are widely utilized, progressive increases in the powerplant performance requirements have led to increases in engine operating temperatures which have in turn imposed increasingly stringent demands on the turbine materials. Historically, the extent of the engine temperature increases has been limited by the physical characteristics of the hot section alloys, particularly those used in the highly stressed components such as turbine blades and vanes. Recent alloy developments, promising advances in coating technology, and the use of internal cooling techniques, however, will now allow turbine operating temperatures to be significantly increased.

Repair of gas turbine got-section components made of superalloys are often carried out by welding. These nickel-base superalloys, especially those advanced grades containing relatively high contents of the strengthening γ' phase, are susceptible to cracking during the post-weld heat treatment that is employed to regenerate the desired microstructure-dependent properties. As a result, these superalloys are considered to be difficult to weld materials. One way to improve the weldability of this group of superalloys is to subject the materials to a pre-weld averaging treatment. This increases the material ductility which, in turn, helps to limit the buildup of residual stress produced by welding, and reduces the susceptibility to post-weld heat treatment cracking of the material. One such averaging treatment is described in U.S. Pat. No. 5,509,980 and is complex, time consuming and costly.

Accordingly, it is an object of the present invention to provide a relatively short time pre-weld preparation treatment that renders difficult or marginally weldable precipitation hardenable nickel-base superalloys readily weldable without weld-associated cracking during post-weld heat treatment.

It is a further object of the present invention to provide a relatively short time pre-weld preparation treatment that renders difficult or marginally weldable precipitation hardenable nickel-base superalloys readily weldable without the need for alloy compositional modifications and without the need for changes to otherwise conventional fusion welding procedures.

SUMMARY OF THE INVENTION

These and other objects are achieved by the present invention which employs a weld preparation process whereby a consumable or nonconsumable tool is translated along an area that is to be subsequently welded. Rotary or linearly oscillated motion between the tool and the workpiece is used to generate heat and produce deformation in the surface, resulting in recrystallization of the area being processed. The recrystallization structure that is thus produced by friction processing makes a region that is less prone to cracking problems that are typically encountered when the processed area is subsequently welded. Additionally, friction processing produces a compressive residual stress, which counteracts the tensile stresses that contribute to the heat affected zone cracking experienced in post-weld heat treatments. The area so processed is let to cool and then subsequently welded by any conventional welding technique.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The present invention provides a process whereby a consumable or nonconsumable tool, such as a friction welder, is translated along an area that is to be subsequently welded, however, no appreciable metal is added to the surface. The rotary or linearly oscillated motion between the tool and the surface of the workpiece generates heat and produces deformation, resulting in recrystallization of the area being processed. Friction welding has been used to join materials previously. This invention is a variant on this joining process since it is used to condition the material prior to welding, not to join it. The recrystallized structure that is produced by friction processing makes a region that is less prone to cracking problems that are typically encountered after post-weld heat treatments. Additionally, friction processing produces a compressive residual stress, which counteracts the tensile stresses that contribute to heat-affected zone cracking.

Figure 1:
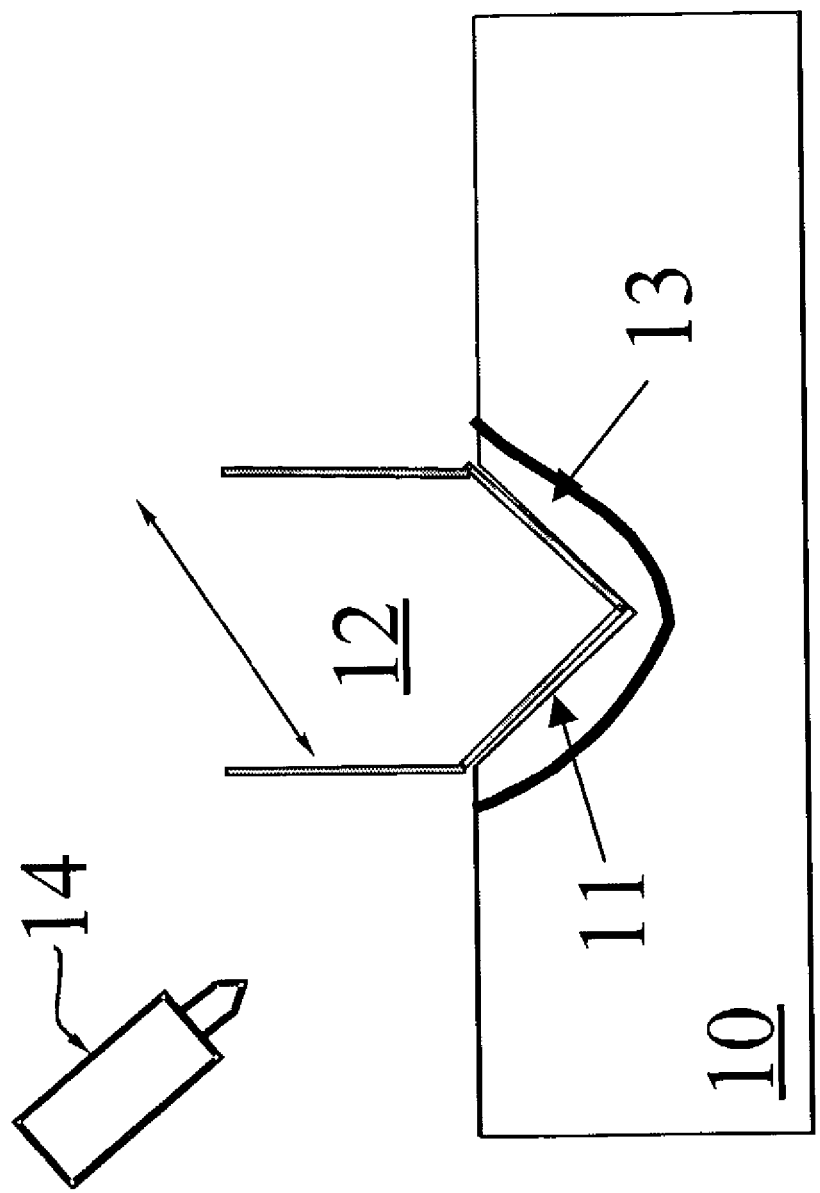
FIG. 1 is a schematic view of a flat workpiece having a friction tool applied to a gouged-out portion thereof.

FIG. 1 illustrates a workpiece 10 that has had a portion of its surface 15 ground off to remove defective metal, which forms the groove 11. A consumable or nonconsumable tool 12 is linearly oscillated within the groove 11 against the surface 15 of the groove 11 resulting in the generation of heat and some deformation of the surface of the groove 11. The result is the recrystallization of the area 13 underlying the groove 11. The groove is let to cool and thereafter the welding torch 14 can be employed to bond additional metal within the groove to build up the groove and repair the surface 15 of the workpiece 10. Grinding away defective metal and replacing it with welded fresh metal is a common repair technique for repairing turbine blades. Essentially any fusion welding process currently employed for such purpose, such as laser welding or tungsten inert gas welding, can be employed following the application of the friction heating process of this invention to first prepare the surface to be welded.

Figure 2:
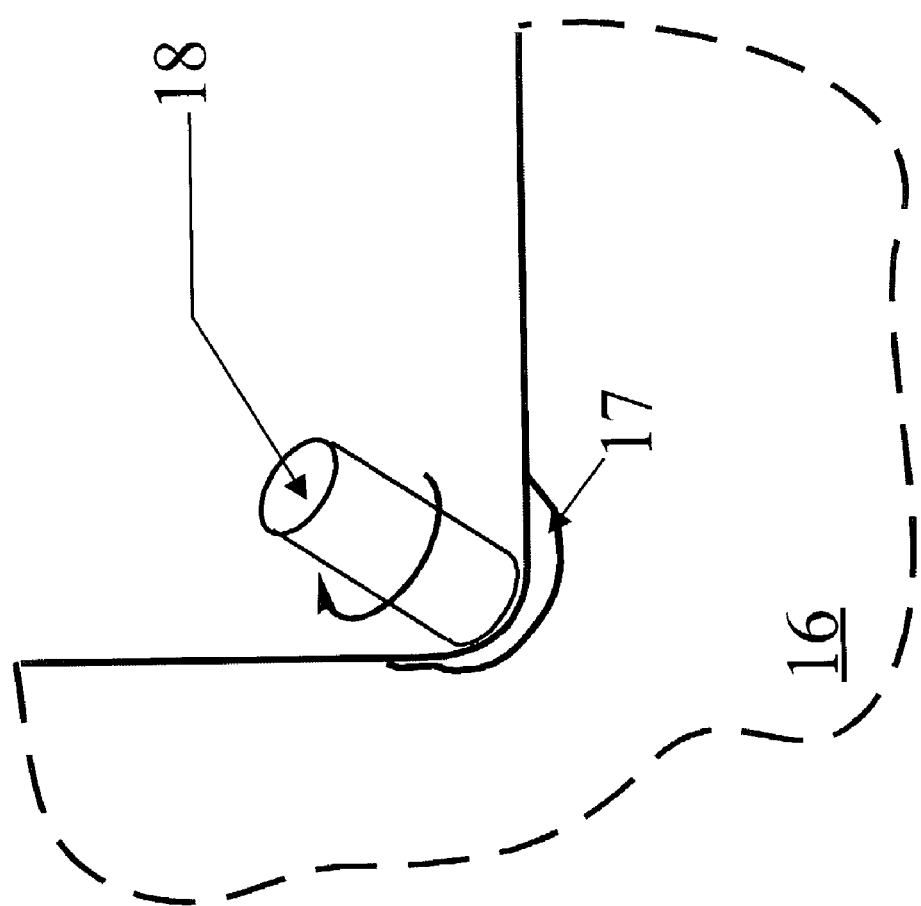
FIG. 2 is a schematic view of an angular workpiece to which a rotary friction tool is applied.

FIG. 2 illustrates a second workpiece having an angular design to show that this invention can be adapted to a variety of surface geometries, such as flat, machine fillets, and spline profiles. In this case, a friction tool 18 having a rotating head is applied to the angular surface 16 to recrystallize the area 17 just underlying the surface to which the friction processing is applied. Though the invention has been described in connection with a weld preparation for repairing metal surfaces, it should be appreciated that it also can be employed as a weld preparation for joining surfaces.

The weld preparation process shown in FIG. 2 performed on a flat surface was tested on a nickel based alloy that was non gamma prime strengthened and was shown to improve the weld property of the metal. A one inch (2.54 cm) diameter tool was used, rotating at 500 revolutions per minute. The tool pressed 0.010 inch (0.0254 cm) below the original surface of the work piece and moved across the surface of the work piece at 3 inches (7.62 cm) per minute.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of preparing and welding a component surface constructed from an original base metal of the component as originally manufactured comprising the steps of:
   moving a tool directly across the surface of the base metal to be welded, prior to welding, to heat the component base metal surface by friction stirring directly on the surface of the base metal, without appreciably adding metal or joining two abutted metal surfaces, to recrystallize the surface of the base metal;
   letting the surface cool; and
   adding metal to the surface by welding.

2. The method of claim 1 wherein the moving step is carried out by translating the tool across the component surface with a linearly oscillating motion.

3. The method of claim 1 wherein the moving step is carried out by translating the tool across the component surface with a rotary motion.

4. The method of claim 1 including the step of pressing the tool against the component surface as the tool is moved across the surface.

5. The method of claim 1 wherein the welding step is carried out by a tungsten inert gas welding process.

6. The method of claim 1 wherein the welding step is carried out by a laser welding process.

* * * * *